United States Patent
Utz et al.

(10) Patent No.: US 12,507,369 B2
(45) Date of Patent: Dec. 23, 2025

(54) SERVER SYSTEM DRIVE MOUNTING SYSTEM INCLUDING A NETWORK CONTROLLER MOUNTING BRACKET

(71) Applicant: Dell Products L.P., Round Rock, TX (US)

(72) Inventors: James Utz, Georgetown, TX (US); Eduardo Escamilla, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 178 days.

(21) Appl. No.: 18/426,247

(22) Filed: Jan. 29, 2024

(65) Prior Publication Data

US 2025/0247990 A1      Jul. 31, 2025

(51) Int. Cl.
    *H05K 7/14*        (2006.01)
    *G06F 1/18*        (2006.01)

(52) U.S. Cl.
    CPC ........... *H05K 7/1489* (2013.01); *G06F 1/181* (2013.01)

(58) Field of Classification Search
    CPC ...................................................... G06F 30/17
    See application file for complete search history.

(56) References Cited

U.S. PATENT DOCUMENTS

2008/0055875 A1 *  3/2008  Berke ................ H05K 7/1487
                                                                361/800
2022/0350935 A1 * 11/2022 Strickland ............... G06F 30/17

* cited by examiner

*Primary Examiner* — Jerry Wu
(74) *Attorney, Agent, or Firm* — Terrile, Cannatti & Chambers, LLP; Stephen A. Terrile

(57) ABSTRACT

A modular device bay mounting system. The modular device bay mounting system includes a front bay component; a rear bay component; and, a mid bay component extending from the front bay component to the rear bay component, the mid bay component comprising a modular adapter component, the modular adapter component comprising: a mid bay adapter base structure, the mid bay adapter base structure being configured to be mounted to a base plate of the mid bay component; and, a mid bay latch device, the mid bay latch device being pivotally mounted to the mid bay adapter base structure; and wherein when the mid bay adapter base plate is not mounted to the base plate of the mid bay component, the modular device bay mounting system is configured to receive a double wide form factor device.

12 Claims, 10 Drawing Sheets

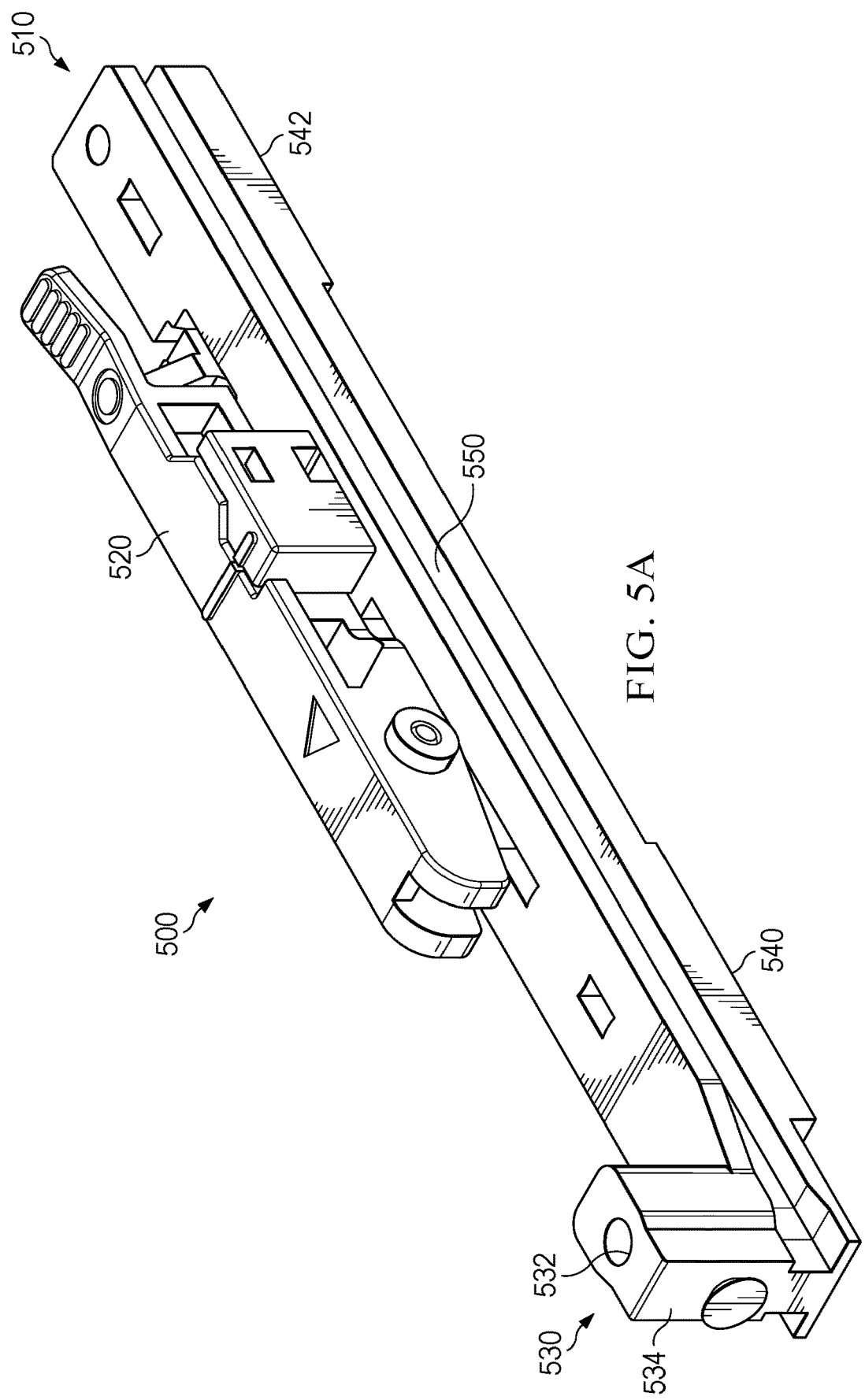

SERVER SYSTEM DRIVE MOUNTING SYSTEM INCLUDING A NETWORK CONTROLLER MOUNTING BRACKET

BACKGROUND OF THE INVENTION

Field of the Invention

The present invention relates to information handling systems. More specifically, embodiments of the invention relate to server type information handling systems within information technology (IT) environments.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known to use information handling systems and related IT systems within information technology (IT) environments such as data centers.

SUMMARY OF THE INVENTION

A system and method for providing a modular device bay such that a single modular device bay may be configured to support a plurality of device form factors.

In one embodiment, the invention relates to a modular adapter component for use with a modular device bay mounting system, comprising: a mid bay adapter base structure, the mid bay adapter base structure being configured to be mounted to a base plate of a mid bay component; and, a mid bay latch device, the mid bay latch device being pivotally mounted to the mid bay adapter base structure; and wherein when the mid bay adapter base plate is not mounted to the base plate of the mid bay component, the modular device bay mounting system is configured to receive a double wide form factor device; and, when the mid bay adapter base plate is mounted to the base plate of the mid bay component, the modular device bay mounting system is configured to receive a plurality of single wide form factor devices.

In another embodiment, the invention relates to a modular device bay mounting system comprising: a front bay component; a rear bay component; and, a mid bay component extending from the front bay component to the rear bay component, the mid bay component comprising a modular adapter component, the modular adapter component comprising: a mid bay adapter base structure, the mid bay adapter base structure being configured to be mounted to a base plate of the mid bay component; and, a mid bay latch device, the mid bay latch device being pivotally mounted to the mid bay adapter base structure; and wherein when the mid bay adapter base plate is not mounted to the base plate of the mid bay component, the modular device bay mounting system is configured to receive a double wide form factor device; and, when the mid bay adapter base plate is mounted to the base plate of the mid bay component, the modular device bay mounting system is configured to receive a plurality of single wide form factor devices.

In another embodiment, the invention relates to a system comprising: a chassis; a processor electrically coupled to a planar board, the planar board being mounted within the chassis; a data bus coupled to the processor; and, a modular device bay mounting system physically coupled to the chassis of the system, the modular device bay mounting system comprising: a mid bay adapter base structure, the mid bay adapter base structure being configured to be mounted to a base plate of the mid bay component; and, a mid bay latch device, the mid bay latch device being pivotally mounted to the mid bay adapter base structure; and wherein when the mid bay adapter base plate is not mounted to the base plate of the mid bay component, the modular device bay mounting system is configured to receive a double wide form factor device; and, when the mid bay adapter base plate is mounted to the base plate of the mid bay component, the modular device bay mounting system is configured to receive a plurality of single wide form factor devices.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIGS. 5A, 5B, 5C, 5D, 5E, 5F, and 5G, generally referred to as FIG. 5, respectively show a perspective view, a top view, a bottom view, a right view, a left view, a front view and a rear view of a modular adapter for use with a modular network controller bay mounting.

DETAILED DESCRIPTION

Various aspects of the disclosure include an appreciation that it is known to provide information handling systems with devices which conform to specifications defined by an open compute project (OCP) foundation. Various aspects of the disclosure include an appreciation that the open compute project (OCP) foundation has also defined a plurality of additional specifications some of which are within a datacenter modular hardware system (DC-MHS) family of specifications. Various aspects of the present disclosure include an appreciation that one such additional specification is the open compute project network interface controller (OCP NIC) specification such as the OCP NIC 3.0 specification.

Various aspects of the present disclosure include an appreciation that the OCP NIC specification is likely to define a plurality of network interface controller form factors. Various aspects of the present disclosure include an appreciation that the plurality of OCP NIC form factors include a single wide NIC form factor and a double wide NIC form factor. Various aspects of the present disclosure include an appreciation that the double wide NIC form factor is designed to enable a double-wide OCP NIC to connect to two, side-by-side connectors (e.g., 4C+ connectors) on the planar of a server type information handling system. Various aspects of the present disclosure include an appreciation that planar boards can be designed to support both single wide and double wide OCP NIC form factors. Examples of planar boards that could be so designed include a modular hardware system full width (M-FLW) planar board design and a data center modular hardware system (DC-MHS) planar board design. Various aspects of the present disclosure include an appreciation that it would be desirable to provide a single information handling system chassis design that supports both dual OCP NICs and a single Double-Wide OCP NIC. Various aspects of the present disclosure include an appreciation that such a chassis design requires different chassis bay openings, card guide rails, and card latching.

A system and method are disclosed for providing a modular device bay. In certain embodiments, a single modular device bay may be configured to support a plurality of device form factors. In certain embodiments, the plurality of device form factors includes a plurality of network interface controller form factors. In certain embodiments, the plurality of network interface controller form factors includes a single wide form factor and a double wide form factors. In certain embodiments, the plurality of network interface controller form factors corresponds to form factors defined by an OCP NIC specification.

Figure 1:
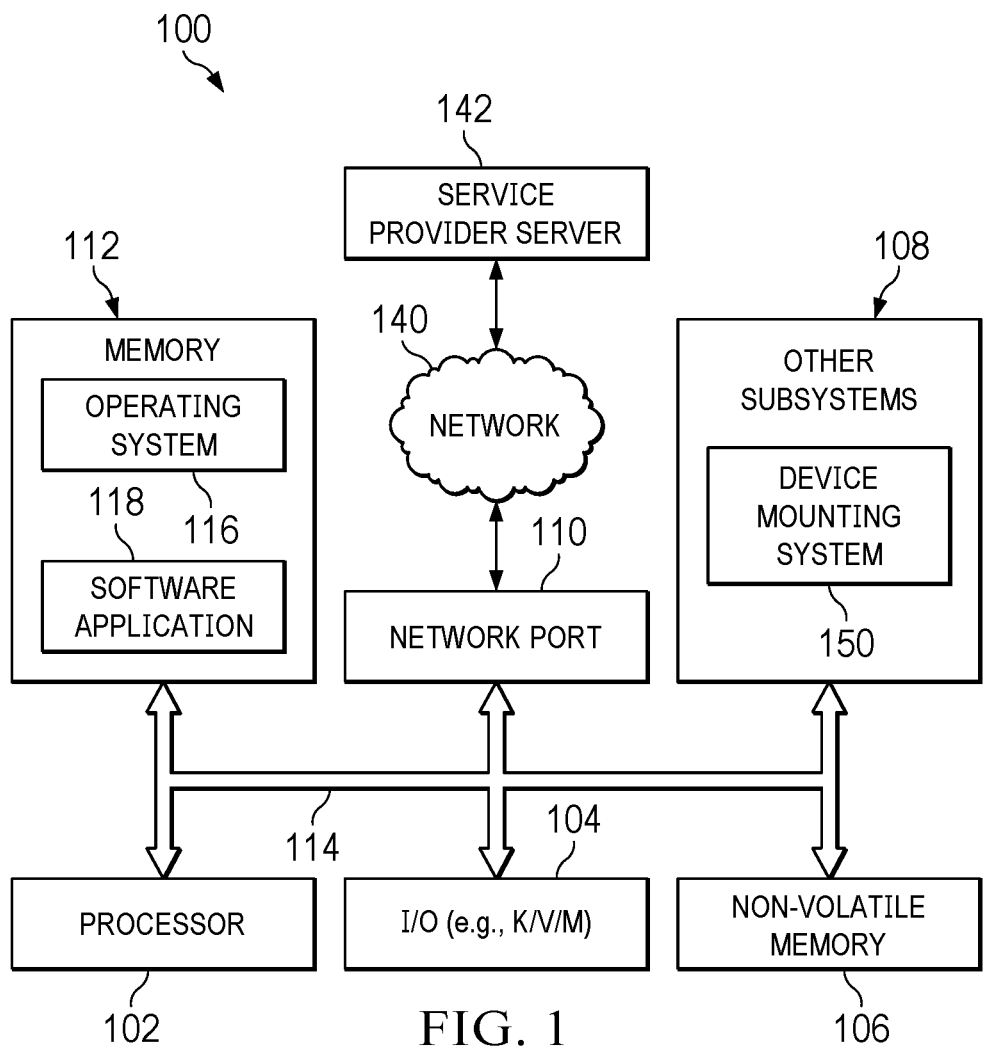
FIG. 1 shows a general illustration of components of an information handling system as implemented in the system and method of the present invention.

FIG. 1 shows a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. In various embodiments, one or both the other subsystems 108 or the network port 110 include a drive mounting system 150. The information handling system 100 likewise includes system memory 112, which is interconnected to the foregoing via one or more buses 114. System memory 112 further comprises operating system (OS) 116. In certain embodiments, the information handling system 100 is one of a plurality of information handling systems within a data center. In certain embodiments, the information handling system 100 comprises a server type information handling system. In certain embodiments, the server type information handling system is configured to be mounted within a server rack. In certain embodiments, the other subsystem 108 includes one or more power supplies for supplying power to the other components of the information handling system 100.

In certain embodiments, the information handling system 100 comprises a server type information handling system. In certain embodiments, the server type information handling system comprises a blade server type information handling system. As used herein, a blade server type information handling system broadly refers to an information handling system which is physically configured to be mounted within a server rack.

In certain embodiments, the device mounting system 150 includes a modular device bay. In certain embodiments, a single modular device bay may be configured to support a plurality of device form factors. In certain embodiments, the plurality of device form factors includes a plurality of network interface controller form factors. In certain embodiments, the plurality of network interface controller form factors includes a single wide form factor and a double wide form factors. In certain embodiments, the plurality of network interface controller form factors corresponds to form factors defined by an OCP NIC specification.

Such a modular device bay advantageously allows a single information handling system chassis design to support a plurality of device form factors. Such a modular device bay advantageously allows a single information handling system chassis design to support a pair of OCP network interface controllers and a single Double-Wide OCP network interface controller.

Figure 2:
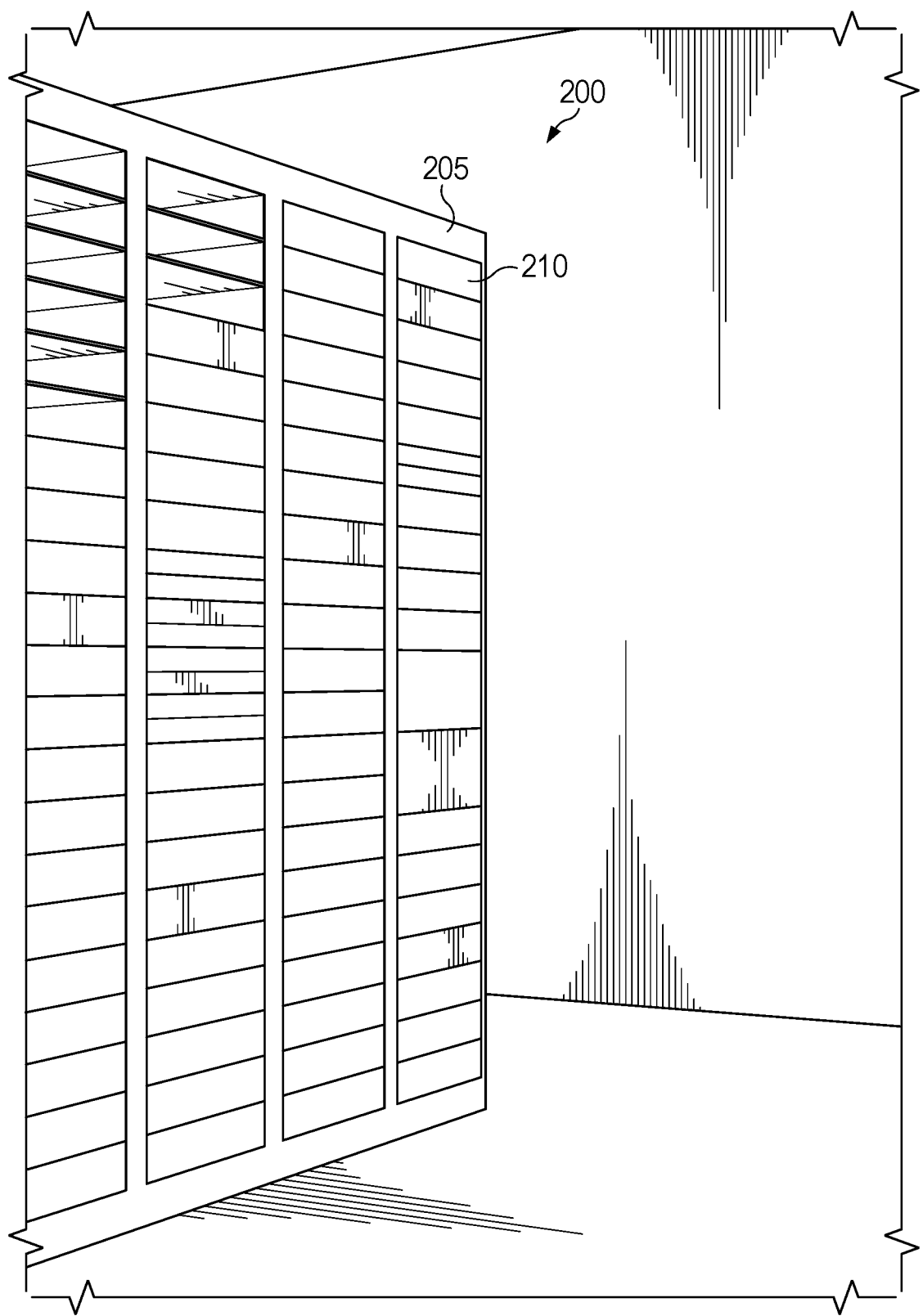
FIG. 2 shows a perspective view of a portion of a data center within an IT environment.

FIG. 2 shows a perspective view of a portion of an IT environment 200. The IT environment includes one or more racks 205 which include a plurality of information handling systems 100, often referred to as a server rack. In various embodiments, the IT environment 200 comprises a data center. As used herein, a data center refers to an IT environment which includes a plurality of networked information handling systems 100. In various embodiments, the information handling systems 100 of the data center include some or all of router type information handling systems, switch type information handling systems, firewall type information handling systems, storage system type information handling systems, server type information handling systems and application delivery controller type information handling systems. In certain environments, the information handling systems 100 are mounted within respective racks. As used herein, a rack refers to a physical structure that is designed to house the information handling systems 100 as well as the associated cabling and power provision for the information handling systems. In certain embodiments, a rack includes side panels to which the information handling systems are mounted. In certain embodiments, the rack includes a top panel and a bottom panel to which the side panels are attached. In certain embodiments, the side panels each include a front side panel and a rear side panel.

In certain embodiments, a plurality of racks is arranged continuously with each other to provide a rack system. An IT environment can include a plurality of rack systems arranged in rows with aisles via which IT service personnel can access information handling systems mounted in the racks. In certain embodiments, the aisles can include front aisles via which the front of the information handling systems may be accessed and hot aisles via which the infrastructure (e.g., data and power cabling) of the IT environment can be accessed.

Each respective rack includes a plurality of vertically arranged information handling systems 210. In certain embodiments, the information handling systems may conform to one of a plurality of standard server sizes. In certain embodiments, the plurality of server sizes conforms to particular rack unit sizes (i.e., rack units). As used herein, a rack unit broadly refers to a standardized server system height. As is known in the art, a server system height often conforms to one of a 1U rack unit, a 2U rack unit and a 4U rack unit. In general, a 1U rack unit is substantially (i.e., +/−20%) 1.75" high, a 2U rack unit is substantially (i.e., +/−20%) 3.5" high and a 4U rack height is substantially (i.e., +/−20%) 7.0" high.

Figure 3:
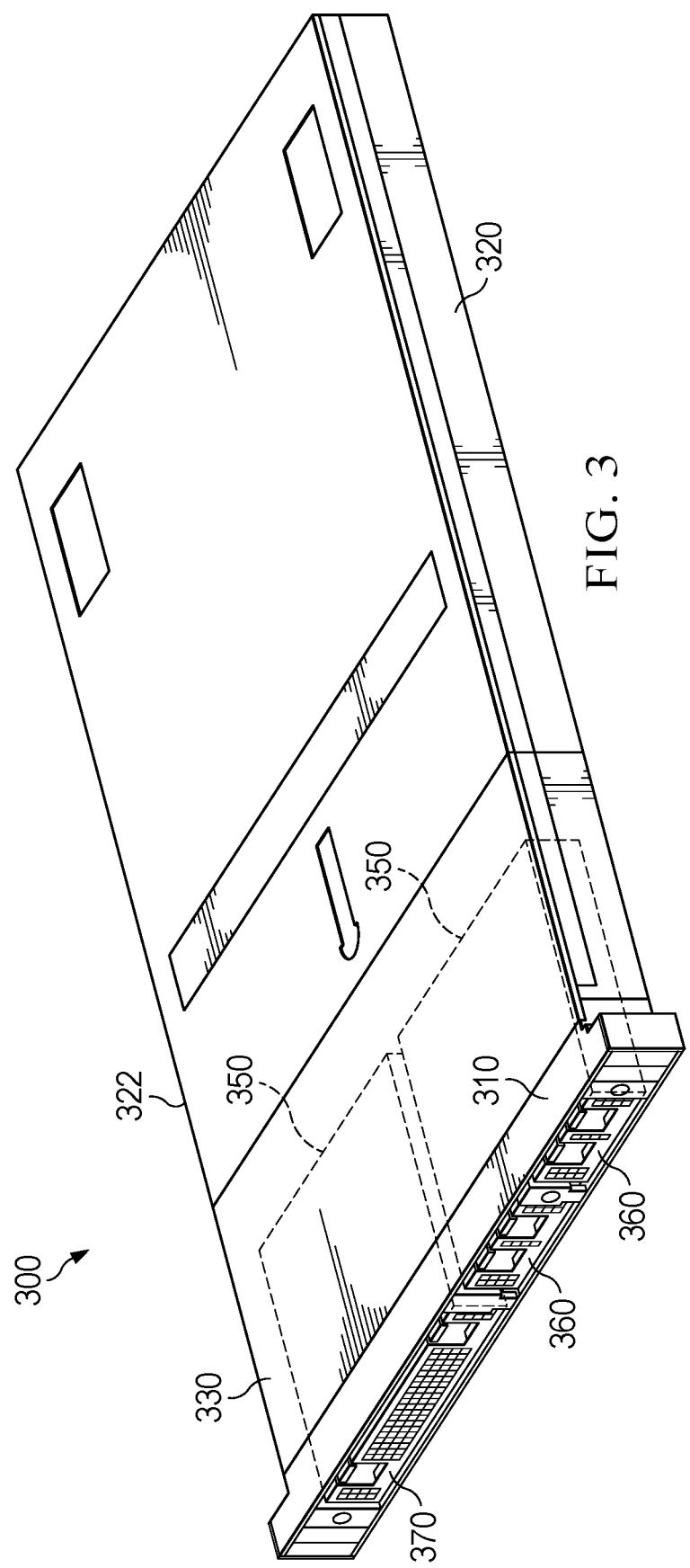
FIG. 3 shows a generalized perspective view of an example server type information handling system.

FIG. 3 shows a generalized perspective view of an example server type information handling system 300. In certain embodiments, the server type information handling system includes a front portion 310, which is accessible when the server type information handing system 300 is mounted on a server rack. In certain embodiments, the side portions 320, 322 mount to the rack via respective server mounting components. In certain embodiments, the side portions mount to the rack via respective mechanical guiding features which are mechanically coupled to respective server mounting components. In certain embodiments, the server type information handling system can slide out from the rack via the respective mechanical guiding features. In certain embodiments, internal components of the server type information handling system 300 may be accessed by removing a top panel 330 of the server type information handing system 300. In certain embodiments, the server type information handing system 300 includes one or more front bays 350 via which components may be mounted to the server type information handling system. In certain embodiments, the server type information handing system 300 includes can also include one or more rear bays via which components may be mounted to the server type information handling system. In certain embodiments, the front bays 350, the rear bays 352, or a combination thereof, includes respective device bay mounting systems (such as device bay mounting system 150).

In certain embodiments, a device mounting system which is mounted in the front bays 350 is configured as a modular device bay. In certain embodiments, a single modular device bay may be configured to support a plurality of device form factors. In certain embodiments, the plurality of device form factors includes a plurality of network interface controller form factors. In certain embodiments, the plurality of network interface controller form factors includes a single wide form factor and a double wide form factors. In certain embodiments, the plurality of network interface controller form factors corresponds to form factors defined by an OCP NIC specification. In certain embodiments, a pair of devices 360 which conform to a single wide form factor may be mounted in a single modular device bay. In certain embodiments, a device 370 which conforms to a double wide firm factor may be mounted in a single modular device bay.

Such a modular device bay advantageously allows a single information handling system chassis design to support a plurality of device form factors. Such a modular device bay advantageously allows a single information handling system chassis design to support a pair of OCP network interface controllers and a single Double-Wide OCP network interface controller.

Figure 4A:
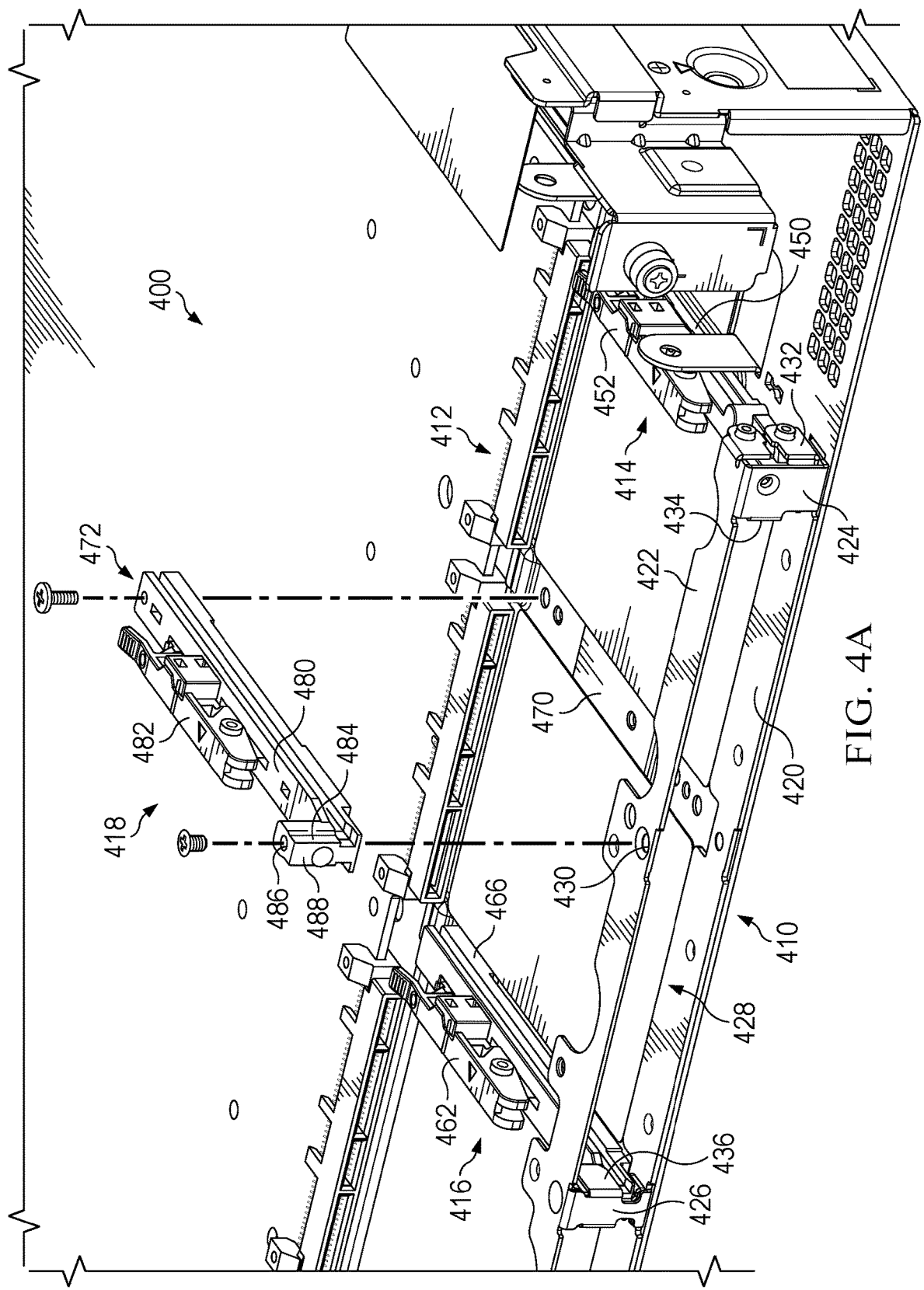
FIGS. 4A, 4B and 4C, generally referred to as FIG. 4, respectively show an exploded cut away perspective view of a modular network controller bay mounting, an exploded perspective view of a modular network controller bay mounting and a perspective view of a modular network controller bay mounting in which a double wide network controller is mounted.
Figure 4B:
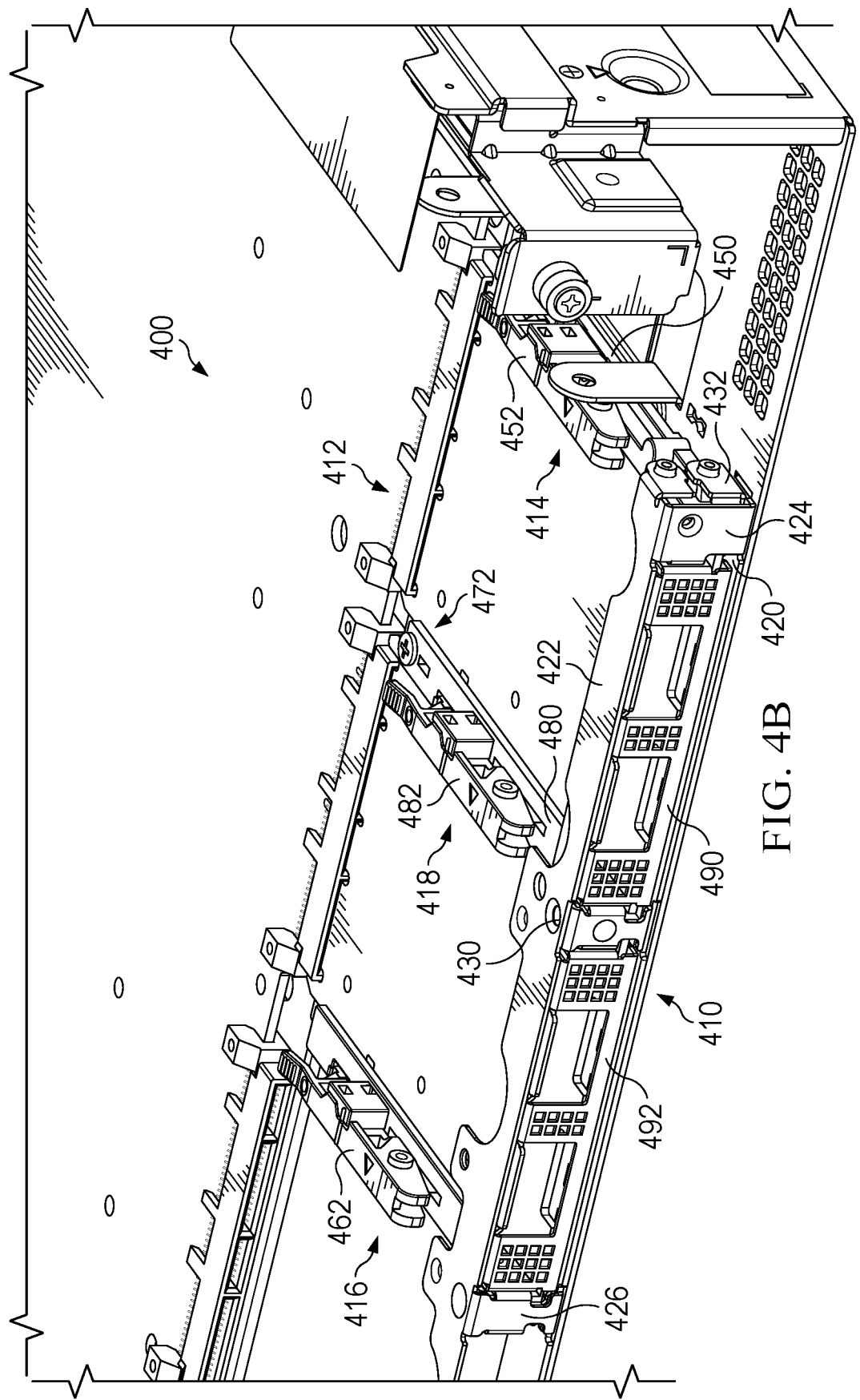
Figure 4C:
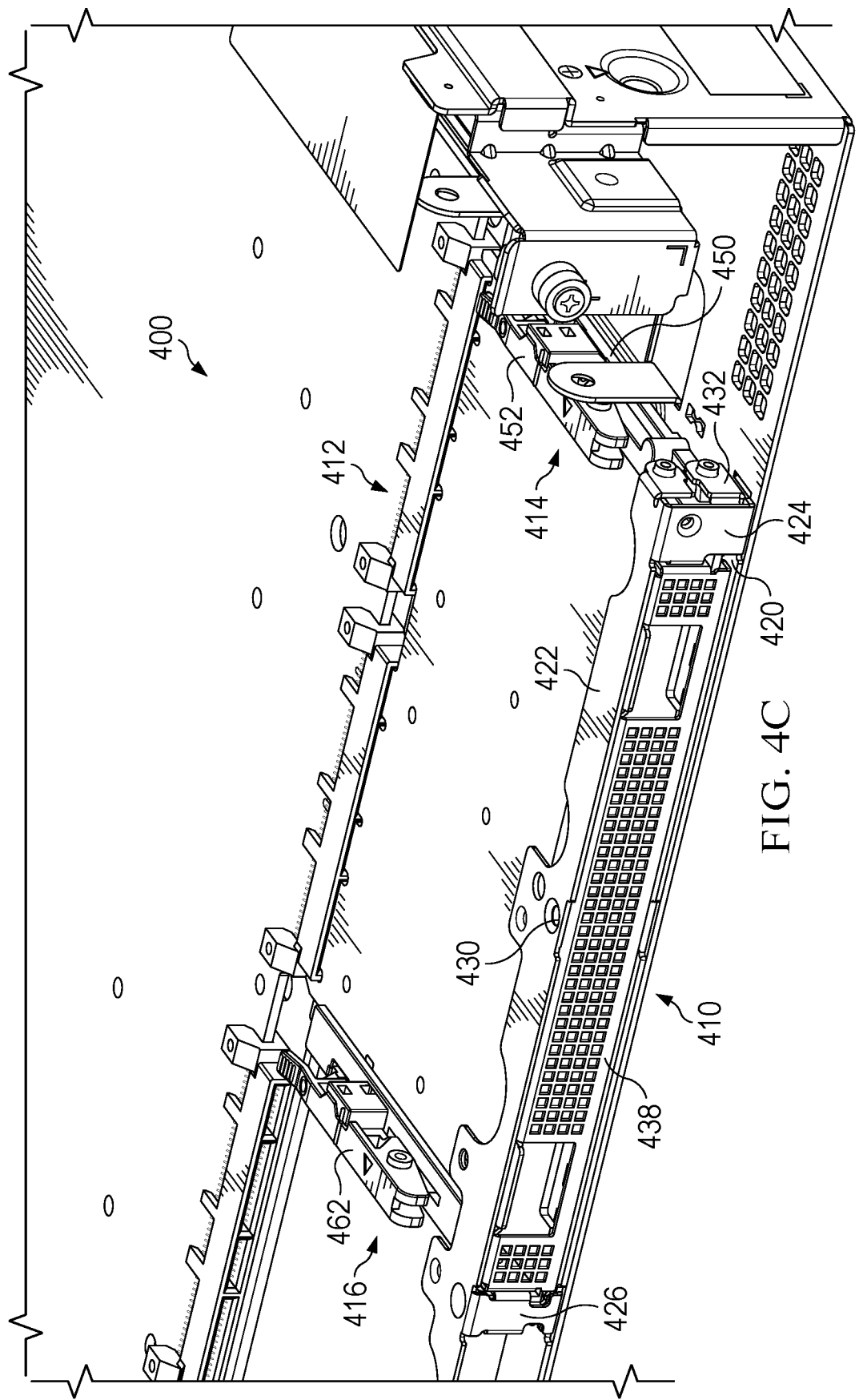
Figure 5B:
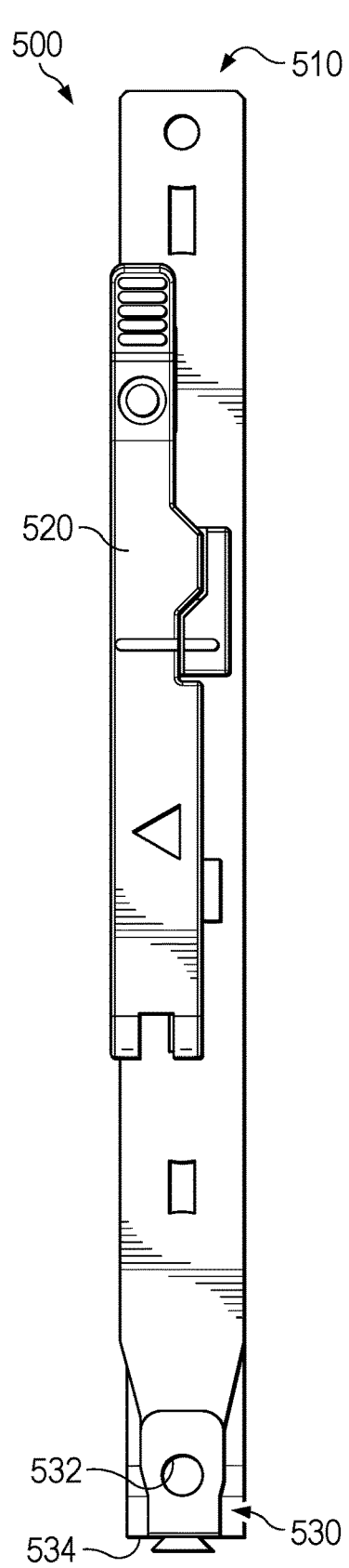
Figure 5C:
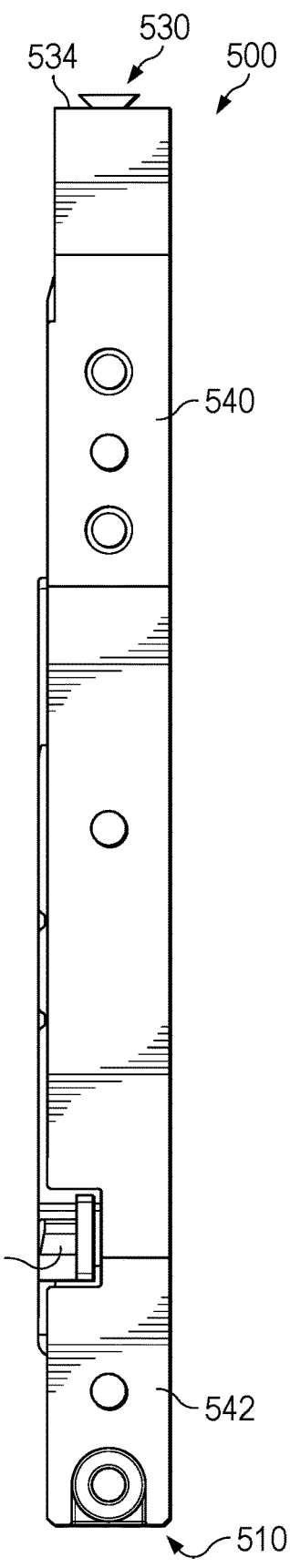
Figure 5D:
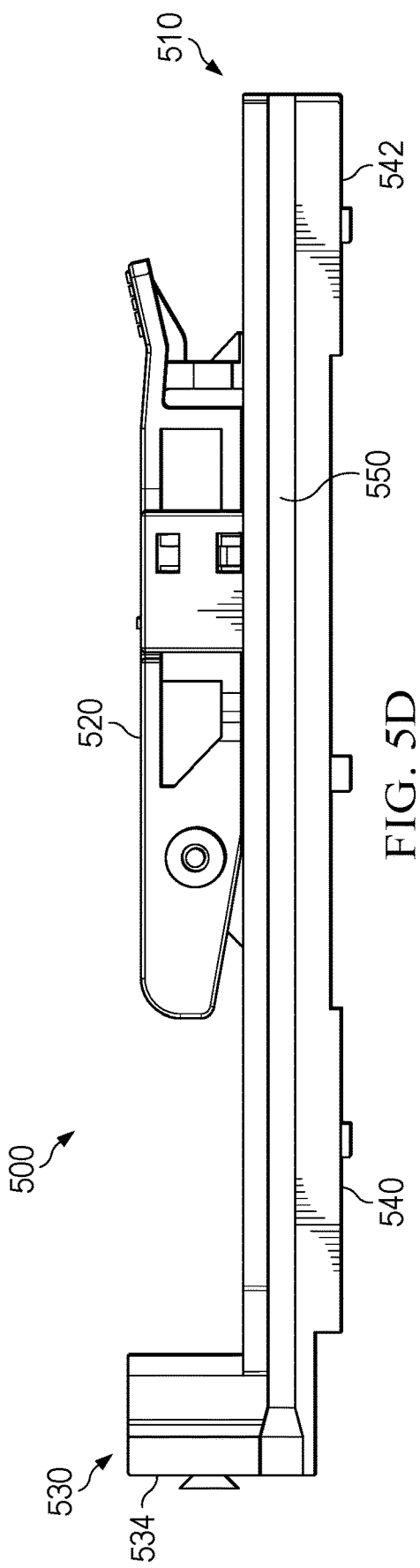
Figure 5E:
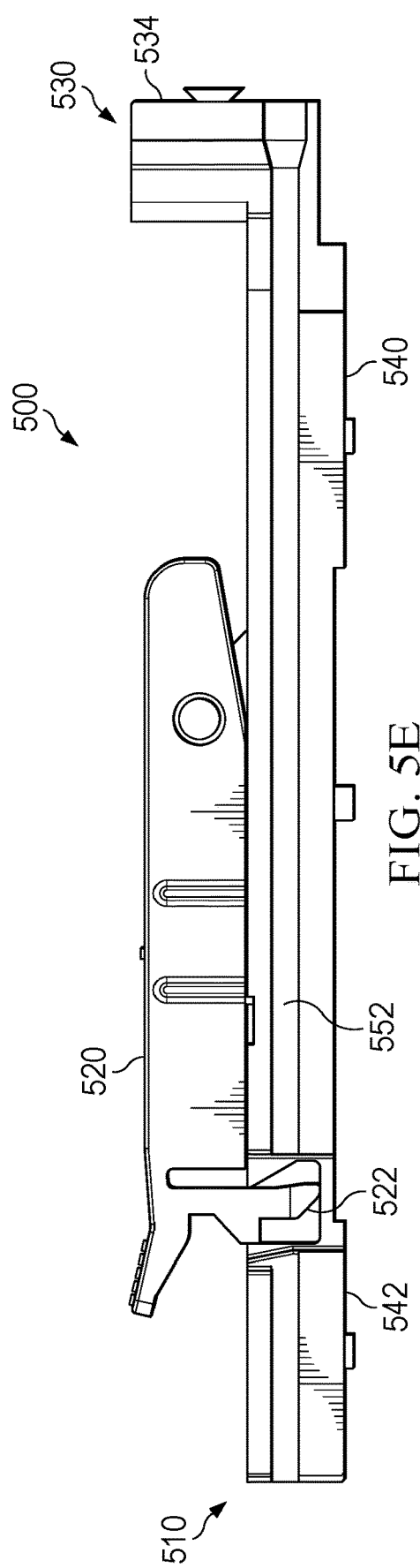
Figure 5G:
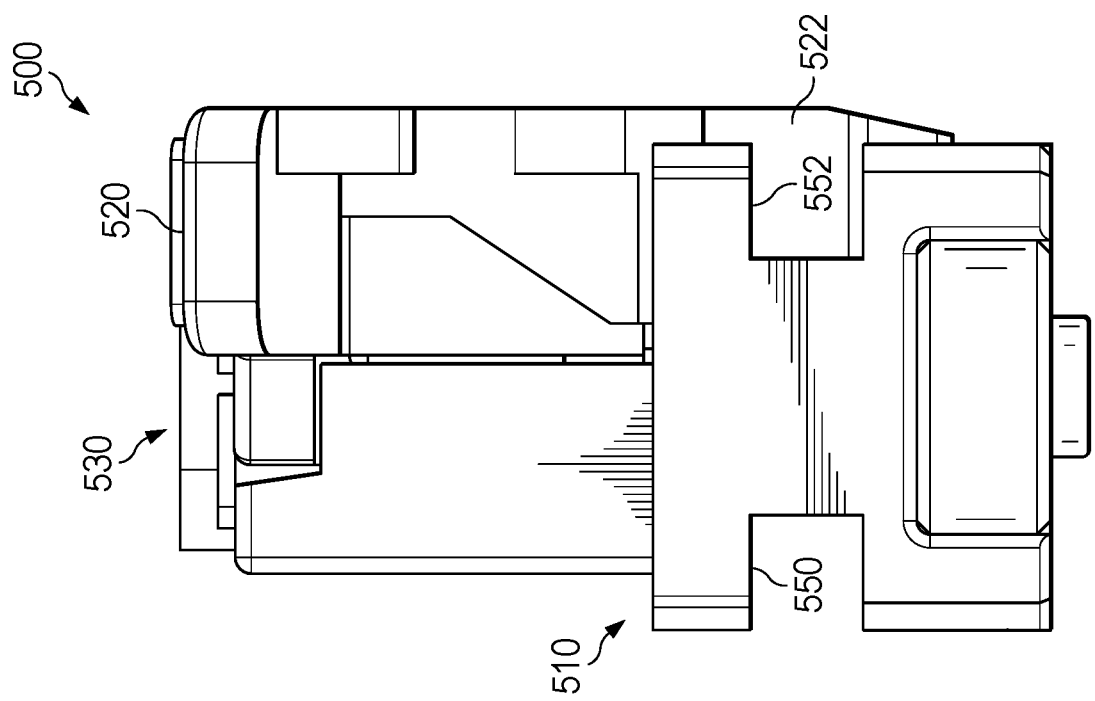
Figure 5F:
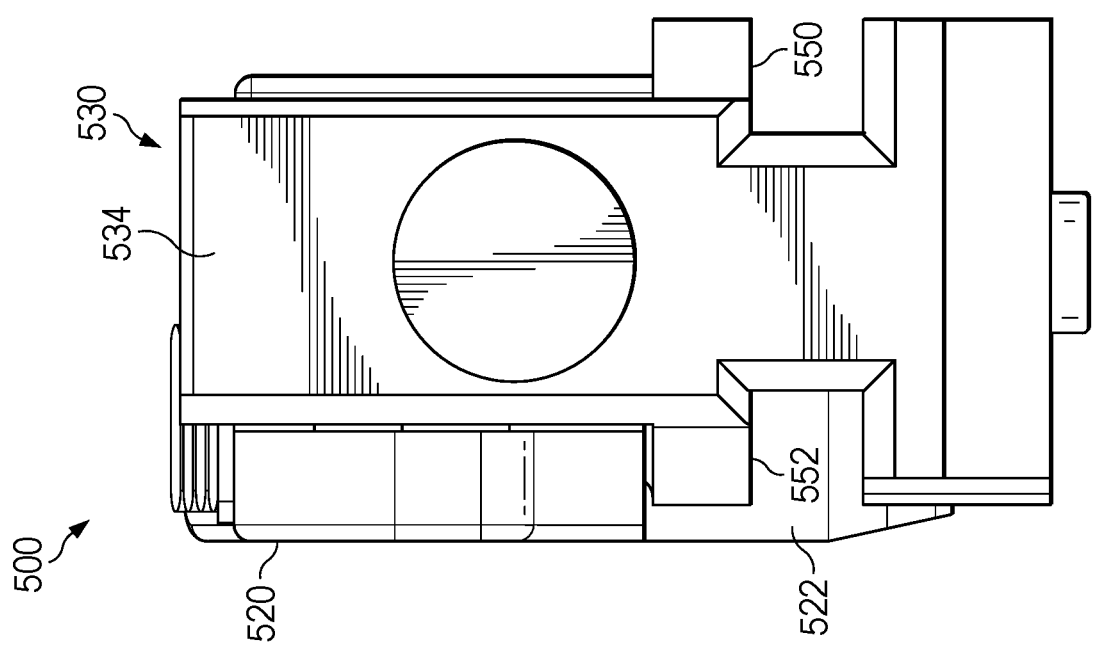

FIGS. 4A, 4B and 4C, generally referred to as FIG. 4, respectively show an exploded cut away perspective view of a modular network controller bay mounting, an exploded perspective view of a modular network controller bay mounting and a perspective view of a modular network controller bay mounting in which a double wide network controller is mounted. In certain embodiments, a server type information handling system includes a modular network controller bay mounting system 400. The modular network controller bay mounting system 400 enables configurable network controller device mounting within a single device bay. More specifically, the modular network controller bay mounting system may be configured to mount a plurality of network controller devices conforming to a first device form factor (see e.g., FIG. 4B) or a single network controller device conforming to a second device form factor (see e.g., FIG. 4C).

In certain embodiments, the first device form factor is a single wide form factor. In certain embodiments, the second device form factor is a double wide form factor. In certain embodiments, the first device form factor is substantially (i.e., +/−20%) half as wide as the second device form factor. In certain embodiments, the second device form factor is substantially (i.e., +/−20%) twice as wide as the first device form factor. In certain embodiments, the first device form factor corresponds to a form factor defined by an OCP specification. In certain embodiments, the second device form factor corresponds to second form factor corresponds to a form factor defined by an OCP specification. In certain embodiments, the device form factors include a network interface controller form factors. In certain embodiments, the network interface controller form factors include a single wide NIC form factor and a double wide NIC form factors. In certain embodiments, the network interface controller form factors correspond to form factors defined by an OCP NIC specification. In certain embodiments, a pair of devices 360 which conform to a single wide form factor may be mounted in a single modular device bay. In certain embodiments, a device 370 which conforms to a double wide firm factor may be mounted in a single modular device bay.

In certain embodiments, the modular network controller bay mounting system 400 includes a front bay component 410, a rear bay component 412, a right bay component 414, a left bay component 416, a mid bay component 418, or a combination thereof. In certain embodiments, the right bay component 414 extends substantially perpendicularly (i.e., +/−20%) from the front bay component 410. In certain embodiments, the left bay component 416 extends substantially perpendicularly (i.e., +/−20%) from the front bay component 410. In certain embodiments, the rear bay component 412 extends substantially perpendicularly (i.e., +/−20%) between the right bay component 414 and the left bay component 416. In certain embodiments, the mid bay component 418 extends substantially perpendicularly (i.e., +/−20%) between the front bay component 410 and the rear bay component 412. In certain embodiments, the mid bay component 418 is horizontally positioned substantially (i.e., +/−20%) mid way between the right bay component 414 and the left bay component 416.

In certain embodiments, the front bay component 410 includes a bottom wall 420, a top wall 422, a right wall 424, a left wall 426, or a combination thereof. In certain embodiments, the bottom wall 420, the top wall 422, the right wall 424, the left wall 426, or a combination thereof, define a void 428. In certain embodiments, a network controller may be inserted into the modular network controller bay mounting system 400 through the void. In certain embodiments, the top wall 422 defines an aperture 430 via which a modular adapter of a mid bay component 418 may be attached to the modular network controller bay mounting system 400. In certain embodiments, the right wall 424, the left wall 426, or a combination thereof, each include respective mounting components 432. In certain embodiments, the mounting components 432 are implemented to respectively, physically attach a right bay component 414 and a left bay component 416 to the right wall 424 and the left wall 426. In certain embodiments, the right wall 424 includes a projection 434. In certain embodiments, the left wall 426 includes a projection 436. In certain embodiments, a double wide front panel 438 mates with the right wall projection 434 and the left wall projection 436 when the modular network controller bay mounting system 400 is configured in a double wide form factor mode of operation.

In certain embodiments, the rear bay component 412 includes a right connector 440, a left connector 442, one or more right connector attachment components 444, one or more left connector attachment components 446, or a combination thereof. In certain embodiments, the right connector 440, the left connector 442, or a combination thereof, conform to a server specification. Inc certain embodiments, the server specification includes an OCP specification. In certain embodiments, the right connector 440, the left connector 442, or a combination thereof, are mounted to a planar board of a server type information handling system. In certain embodiments, the right connector 440, the left connector 442, or a combination thereof, include 4C+ type connectors. In certain embodiments, the right connector 440 and the left connector 442 are positioned on the planar board of a server type information handling system to receive a device which conforms to a double wide firm factor (see e.g., FIG. 4C).

In certain embodiments, the right bay component 414 includes a right bay base plate 450, a right bay latch device 452, or a combination thereof. In certain embodiments, the right bay base plate extends substantially perpendicularly (i.e., +/−20%) between the front bay component 410 and the rear bay component 412. In certain embodiments, the right bay latch device 452 is pivotally mounted to the right bay base plate 420. In certain embodiments, the right bay latch device 452 may be pivoted to fasten a right portion of a device conforming to a single wide form factor (see e.g., FIG. 4B) or to fasten a right portion of a device conforming to a double wide form factor (see e.g., FIG. 4C).

In certain embodiments, the left bay component 416 includes a left bay base plate 460, a left bay latch device 462, or a combination thereof. In certain embodiments, the left bay base plate extends substantially perpendicularly (i.e., +/−20%) between the front bay component 410 and the rear bay component 412. In certain embodiments, the left bay latch device 462 is pivotally mounted to the left bay base plate 420. In certain embodiments, the left bay latch device 462 may be pivoted to fasten a left portion of a device conforming to a single wide form factor (see e.g., FIG. 4B) or to fasten a left portion of a device conforming to a double wide form factor (see e.g., FIG. 4C).

In certain embodiments, the mid bay component 418 includes a base plate 470, a modular adapter component 472, or a combination thereof. In certain embodiments, extends substantially perpendicularly (i.e., +/−20%) between the front bay component 410 and the rear bay component 412. In certain embodiments, the modular adapter component 472 may be optionally mounted to the base plate 470. In certain embodiments, when the modular adapter component 472 is so mounted, m. In certain embodiments, when the modular adapter component 472 is so mounted, the modular network controller bay mounting system 400 is configured to receive devices which conform to a single wide NIC form factor.

In certain embodiments, the modular adapter component 472 includes a mid bay adapter base structure 480, a mid bay latch device 482, or a combination thereof. In certain embodiments, the mid bay latch device 482 is pivotally mounted to the mid bay adapter base structure 480. In certain embodiments, the mid bay latch device 482 may be pivoted to fasten a left portion of a first device conforming to a single wide form factor and a right portion of a second device conforming to a single wide form factor or to fasten a left portion of a device conforming to a double wide form factor (see e.g., FIG. 4B). In certain embodiments, the first device is mounted within a right portion of the modular network controller bay mounting system 400. In certain embodiments, the second device is mounted within a left portion of the modular network controller bay mounting system 400.

In certain embodiments, the mid bay adapter base structure 480 includes a front mounting portion 484. In certain embodiments, the front mounting portion 484 defines an aperture 486 via which the modular adapter component 472 may be attached to the front bay component 410 of the modular network controller bay mounting system 400. In certain embodiments, the front mounting portion 484 includes a front wall 488. In certain embodiments, the front wall 488 extends substantially vertically between the bottom wall 420 and the top wall 422 of the front bay component 410 when the modular adapter component 472 is installed in the modular network controller bay mounting system 400. In certain embodiments, the front wall is configured to attach a right device front panel 490 and a left device front panel 492 to the front bay component 410 when the modular network controller bay mounting system 400 is configured in a single wide form factor mode of operation. In certain embodiments, the front wall delineates a right device front panel 490 and a left device front panel 492 when the modular network controller bay mounting system 400 is configured in a single wide form factor mode of operation.

FIGS. 5A, 5B, 5C, 5D, 5E, 5F, and 5G, generally referred to as FIG. 5, respectively show a perspective view, a top view, a bottom view, a right view, a left view, a front view and a rear view of a modular adapter component 500 for use with a modular network controller bay mounting. In certain embodiments, the modular adapter component 500 corresponds to modular adapter component 472. In certain embodiments, the modular adapter component 500 may be optionally within a modular network controller bay mounting system when the modular network controller bay mounting system is configured to receive single wide form factor devices.

In certain embodiments, the modular adapter component 500 includes a mid bay adapter base structure 510, a mid bay latch device 520, or a combination thereof. In certain embodiments, the mid bay latch device 520 is pivotally mounted to the mid bay adapter base structure 510. In certain embodiments, the mid bay latch device 520 may be pivoted to fasten a left portion of a first device conforming to a single wide form factor and a right portion of a second device conforming to a single wide form factor or to fasten a left portion of a device conforming to a double wide form factor (see e.g., FIG. 4B). In certain embodiments, the first device is mounted within a right portion of the modular network controller bay mounting system 400. In certain embodiments, the second device is mounted within a left portion of the modular network controller bay mounting system 400. In certain embodiments, the mid bay latch device 520 includes a mounting projection 522. In certain embodiments, the mounting projection 522 attaches a right edge of a device when the device installed in the left portion of the modular network controller bay mounting.

In certain embodiments, the mid bay adapter base structure 510 includes a front mounting portion 530. In certain embodiments, the front mounting portion 530 defines an aperture 532 via which the modular adapter component 500 may be attached to the front bay component 410 of the modular network controller bay mounting system 400. In certain embodiments, the front mounting portion 530 includes a front wall 534. In certain embodiments, the front wall 534 extends substantially vertically between the bottom wall 420 and the top wall 422 of the front bay component 410 when the modular adapter component 500 is installed in the modular network controller bay mounting system 400. In certain embodiments, the front wall 534 is configured to attach a right device front panel 490 and a left device front panel 492 to the front bay component 410 when the modular network controller bay mounting system 400 is configured in a single wide form factor mode of operation. In certain embodiments, the front wall delineates a right device front panel 490 and a left device front panel 492 when the modular network controller bay mounting system 400 is configured in a single wide form factor mode of operation.

In certain embodiments, the mid bay adapter base structure 510 includes a front base structure mounting projection 540, a rear base structure mounting projection 542, or a combination thereof. In certain embodiments, the front base structure mounting projection 540 mates with a recess defined by the base plate 470 of the mid bay component 418. In certain embodiments, the rear base structure mounting projection 542 mates with a recess defined by the base plate 470 of the mid bay component 418.

In certain embodiments, the mid bay adapter base structure 510 defines a card slot 550, a card slot 552, or a combination thereof. In certain embodiments, the card slot 550 mates with a left edge of device when the device is installed in the right portion of the modular network controller bay mounting when the modular network controller bay mounting is configured in a single wide form factor mode of operation. In certain embodiments, the card slot 552 mates with a right edge of device when the device is installed in the left portion of the modular network controller bay mounting when the modular network controller bay mounting is configured in a single wide form factor mode of operation.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A modular adapter component for use with a modular device bay mounting system, comprising:
   a mid bay adapter base structure, the mid bay adapter base structure being configured to be mounted to a base plate of a mid bay component; and,
   a mid bay latch device, the mid bay latch device being pivotally mounted to the mid bay adapter base structure; and wherein
   when the mid bay adapter base plate is not mounted to the base plate of the mid bay component, the modular device bay mounting system is configured to receive a double wide form factor device;
   when the mid bay adapter base plate is mounted to the base plate of the mid bay component, the modular device bay mounting system is configured to receive a plurality of single wide form factor devices; and
   the mid bay latch device includes a mounting projection, the mounting projection attaching a right edge of a device when the device installed in a left portion of the modular device bay mounting; and the mid bay adapter base structure includes a front mounting portion, the front mounting portion including a front wall, the front wall extending vertically between a bottom wall and a top wall of a front bay component when the modular adapter component is installed in the modular device bay mounting system via an aperture on the top wall.

2. The modular adapter component of claim 1, wherein:
the mid bay adapter base structure includes a base structure mounting projection, the base structure mounting projection mating with a recess defined by a base plate of a mid bay component when the modular adapter component is installed in the modular device bay mounting system.

3. The modular adapter component of claim 1, wherein:
the mid bay adapter base structure defines a card slot, the card slot mating with an edge of a device when device is installed in the modular device bay mounting system.

4. The modular adapter component of claim 1, wherein:
the device comprises a network interface controller (NIC).

5. A modular device bay mounting system comprising:
a front bay component;
a rear bay component; and,
a mid bay component extending from the front bay component to the rear bay component, the mid bay component comprising a modular adapter component, the modular adapter component comprising:
a mid bay adapter base structure, the mid bay adapter base structure being configured to be mounted to a base plate of the mid bay component; and,
a mid bay latch device, the mid bay latch device being pivotally mounted to the mid bay adapter base structure; and wherein
when the mid bay adapter base plate is not mounted to the base plate of the mid bay component, the modular device bay mounting system is configured to receive a double wide form factor device;
when the mid bay adapter base plate is mounted to the base plate of the mid bay component, the modular device bay mounting system is configured to receive a plurality of single wide form factor devices; and
the mid bay latch device includes a mounting projection, the mounting projection attaching a right edge of a device when the device installed in a left portion of the modular device bay mounting; and the mid bay adapter base structure includes a front mounting portion, the front mounting portion including a front wall, the front wall extending vertically between a bottom wall and a top wall of a front bay component when the modular adapter component is installed in the modular device bay mounting system via an aperture on the top wall.

6. The modular device bay mounting system of claim 5, wherein:
the mid bay adapter base structure includes a base structure mounting projection, the base structure mounting projection mating with a recess defined by a base plate of a mid bay component when the modular adapter component is installed in the modular device bay mounting system.

7. The modular device bay mounting system of claim 5, further comprising:
the mid bay adapter base structure defines a card slot, the card slot mating with an edge of a device when device is installed in the modular device bay mounting system.

8. The modular device bay mounting system of claim 5, wherein:
the device comprises a network interface controller (NIC).

9. A system comprising:
a chassis;
a processor electrically coupled to a planar board, the planar board being mounted within the chassis;
a data bus coupled to the processor; and,
a modular device bay mounting system physically coupled to the chassis of the system, the modular device bay mounting system comprising:
a front bay component;
a rear bay component; and,
a mid bay component extending from the front bay component to the rear bay component, the mid bay component comprising a modular adapter component, the modular adapter component comprising:
a mid bay adapter base structure, the mid bay adapter base structure being configured to be mounted to a base plate of the mid bay component; and,
a mid bay latch device, the mid bay latch device being pivotally mounted to the mid bay adapter base structure; and wherein when the mid bay adapter base plate is not mounted to the base plate of the mid bay component, the modular device bay mounting system is configured to receive a double wide form factor device;
when the mid bay adapter base plate is mounted to the base plate of the mid bay component, the modular device bay mounting system is configured to receive a plurality of single wide form factor devices; and
the mid bay latch device includes a mounting projection, the mounting projection attaching a right edge of a device when the device installed in a left portion of the modular device bay mounting; and the mid bay adapter base structure includes a front mounting portion, the front mounting portion including a front wall, the front wall extending vertically between a bottom wall and a top wall of a front bay component when the modular adapter component is installed in the modular device bay mounting system via an aperture on the top wall.

10. The system of claim 9, wherein:
the mid bay adapter base structure includes a base structure mounting projection, the base structure mounting projection mating with a recess defined by a base plate of a mid bay component when the modular adapter component is installed in the modular device bay mounting system.

11. The system of claim 9, wherein:
the mid bay adapter base structure defines a card slot, the card slot mating with an edge of a device when device is installed in the modular device bay mounting system.

12. The system of claim 9, wherein:
the device comprises a network interface controller (NIC).

* * * * *